United States Patent [19]

Fujioka et al.

[11] Patent Number: 4,875,171

[45] Date of Patent: Oct. 17, 1989

[54] WHEEL SPEED CONTROL SYSTEM INCORPORATING IN-GEAR VIBRATION DETECTION AND ELIMINATION MEANS

[75] Inventors: Hideaki Fujioka; Koji Takata, both of Itami, Japan

[73] Assignee: Sumitomo Electric Industries, Ltd., Osaka, Japan

[21] Appl. No.: 100,865

[22] Filed: Sep. 25, 1987

[30] Foreign Application Priority Data

Sep. 26, 1986 [JP]  Japan .................................. 61-228700

[51] Int. Cl.$^4$ ..................... G01H 11/00; G01M 13/02
[52] U.S. Cl. ................................. 364/508; 364/426.01; 364/426.02; 364/551.01; 364/566; 73/593; 73/496
[58] Field of Search ............. 73/660, 593, 609, 1 DV, 73/496, 570, 576, 593, 602, 763, 781, DIG. 1; 188/181 C; 364/426, 571, 575, 580, 424.03, 426.01, 426.02, 426.04, 431.08, 551.01, 565, 566, 508

[56] References Cited

U.S. PATENT DOCUMENTS

| | | | |
|---|---|---|---|
| 3,544,172 | 12/1970 | Howard et al. | 303/92 |
| 3,545,819 | 12/1970 | Gaffney et al. | 303/92 |
| 3,608,981 | 9/1971 | Yui | 303/21 BE |
| 3,610,029 | 10/1971 | Carlson | 73/660 |
| 3,774,977 | 11/1973 | Fink et al. | 303/199 |
| 3,922,022 | 11/1975 | Ochiai | 303/21 |
| 3,950,036 | 4/1976 | Fink et al. | 303/21 BE |
| 4,000,928 | 1/1977 | Takeuchi et al. | 303/103 |
| 4,033,635 | 7/1977 | Montoya | 188/181 |
| 4,352,293 | 10/1982 | Kurihara et al. | 73/593 |
| 4,366,544 | 12/1982 | Shima et al. | 73/660 |
| 4,437,163 | 3/1984 | Kurihara et al. | 73/660 |
| 4,773,013 | 9/1988 | Crapanzano et al. | 303/95 |

FOREIGN PATENT DOCUMENTS

| | | |
|---|---|---|
| 2257907 | 8/1975 | European Pat. Off. . |
| 0180095 | 5/1986 | European Pat. Off. . |
| 2151732 | 7/1985 | United Kingdom . |

*Primary Examiner*—Parshotam S. Lall
*Assistant Examiner*—V. Trans
*Attorney, Agent, or Firm*—Cushman, Darby & Cushman

[57] ABSTRACT

A wheel speed control system incorporating in-gear vibration detection and elimination means for use in a vehicle includes wheel speed detectors for detecting the speed of a wheel, a wheel speed control section such as an antiskid control and/or brake traction control, an in-gear wheel speed control section, and an in-gear vibration detector. When the speed of a drive wheel deviates excessively from the speed of the vehicle as measured by a non-drive wheel, the wheel speed control is operated to control the speed of the drive wheel to become nearly equal to the vehicle speed. A differential circuit is provided for taking a second order differential excess the reference level, indicating that the in-gear vibration is present, the in-gear vibration detector generates as in-gear vibration signal, which substitutes the in-gear wheel speed control for the wheel speed control to eliminate the in-gear vibration possibly caused by the wheel speed control.

20 Claims, 8 Drawing Sheets

WHEEL SPEED CONTROL SYSTEM INCORPORATING IN-GEAR VIBRATION DETECTION AND ELIMINATION MEANS

BACKGROUND OF THE INVENTION

1. Field of the Invention

The present invention relates to an engine and/or brake control system for use in a vehicle and, more particularly, to such a system incorporating a method or a means effective for in-gear vibration elimination.

2. Description of the Prior Art

An antiskid control is disclosed, for example, in U.S. Pat. No. 3,950,036 issued Apr. 13, 1976 to Fink et al. and in U.S. Pat. No. 3,922,022 issued Nov. 25, 1975 to Ochiai and is provided to prevent the wheels from locking, i.e., from making the skid effect when braking the vehicle. When the vehicle is suddenly braked, the wheels will be locked while the vehicle is still moving. This phenomenon is called a skid. When a skid detector detect the skid, the brake pressure is automatically decreased quickly until the skid is eliminated and, thereafter, the brake pressure is automatically increased bit by bit unless the next skid appears. The retrieve of the brake pressure may cause the wheels to skid for the second time. In such a case, the brake pressure is again decreased and then increased in a similar manner. Thus, when the antiskid control starts, strong and weak braking effects are repeated, resulting in the elimination of the skid effect of the wheels during a high deceleration.

The brake traction control is disclosed, for example, in U.S. Pat. No. 3,608,981 issued Sept. 28, 1971 to Shigetomo is provided to prevent the wheels from making the slip effect when rapidly accelerating the vehicle. When the vehicle starts to move at the full open throttle, the drive wheels may spin. In such a case, the drive wheels are automatically braked to suppress the spin. When the spin is suppressed, the brake is automatically weakened to free the drive wheel. The release of the braking effect may cause the drive wheels to spin again for the second time. In such a case, the brake pressure is again increased to brake the drive wheels. Thus, when the brake traction control starts, the braking effect is given intermittently to the drive wheels, resulting in the elimination of the spin of the drive wheels during a high acceleration.

Since the antiskid control and the brake traction control are both provided for detecting a deviation of the wheel speed with respect to the vehicle speed, the antiskid control and the brake traction control are herein generally referred to as a wheel speed control for controlling the speed of the wheel to become nearly equal to the vehicle speed when the speed of the wheel deviates from the speed of the vehicle.

As apparent from the above, either in the antiskid control or in the brake traction control, an intermittent braking effect is provided at various frequencies depending on the various conditions. When the frequency of the intermittent braking effect synchronizes with the natural frequency of the rocking motion of the engine body, the so-called in-gear vibration will be produced.

The engine is usually mounted on the vehicle chassis through cushions, such as rubber sheets, so that when the vehicle is shaken or when the engine is driven on and off intermittently, the engine body makes a rocking motion about its crankshaft at its natural frequency, about 10 Hz, in a manner indicated by arrows shown in FIG. 1. Thus, when the transmission is set to a particular gear position (referred to as an in-gear position), such a rocking motion of the engine is transmitted, in addition to the engine's original driving force, through the chrankshaft and the clutch mechanism to the drive wheels. The rocking motion applied to the drive wheels are referred to as an in-gear vibration. Therefore, when the in-gear vibration takes place, the vehicle accompanies undesirable vibration in the back and forth direction while moving.

The rocking motion of the engine may be created when the driver intermittently steps down the acceleration pedal, but more often it is created when the antiskid control or brake traction control is effected.

According to one prior art, such as disclosed in Japanese Patent Publication (Examined) No. 60-4020, the in-gear vibration is eliminated as described below.

The antiskid control system operates such that when a wheel speed suddenly decreases quicker than the vehicle speed decreases (i.e., vehicle deceleration), a brake pressure decrease signal is generated to decrease brake pressure aiming to recover the wheel speed up to a desirable speed slightly less than the vehicle speed. But sometimes, this sudden decrease of brake pressure induces in-gear vibration while at other times it does not induce such vibration. If in-gear vibration is induced the wheel speed increases and then decreases much more quickly than in normal wheel speed recovery, and does so in a vibratory manner with a resonance frequency of approximately 10 Hz. A typical antiski control system reacts to these quick increases and decreases of wheel speed by increasing and decreasing brake pressure accordingly. These quick increases and decreases of brake pressure are naturally synchronized with the resonance frequency and amplify the vibration of the wheel speed and the brake pressure, resulting in severe vibration of the vehicle itself.

According to the system disclosed in Japanese Patent Publication No. 60-4020, when another brake pressure decrease signal is generated within a predetermined time, such as 0.2 second, from the first brake pressure decrease signal, such a brake pressure decreases signal will be nullified or ignored upon assumption that the second brake pressure decrease signal generated within 0.2 second is totally caused by the counteraction of the first brake pressure decrease. Thus, the brake pressure will not be decreased repeatedly with an interval less than the predetermined time. This will prevent the engine body from making a rocking motion about its crank shaft, thereby preventing the in-gear vibration.

However, the problem in Japanese Patent Publication No. 60-4020 is such that if the skid really occurs within the predetermined time, such a skid will be ignored. The skid will be detected only after a time lapse of more than 0.2 second and, therefore, the skid will be enhanced. Thus, the skid will not be effectively eliminated.

The same problem will occur in the case of elimination of the in-gear vibration under the brake traction control as carried out by a system similar to the above.

SUMMARY OF THE INVENTION

The present invention has been developed with a view to substantially solving the above described disadvantages and has for its essential object to provide an in-gear vibration detector and a method therefor which can discriminate in-gear vibration from other similar vibrations.

It is also an important object of the present invention to provide an in-gear vibration elimination system which can efficiently eliminate the in-gear vibration, even when the system is under the antiskid control or brake traction control.

In accomplishing these and other objects, an in-gear vibration detecting method according to the present invention comprises the steps of detecting a speed of a drive wheel taking a second order differential of the drive wheel speed producing a reference level, and comparing the second order differential with the reference level and producing a signal indicative of the in-gear vibration when the second order differential exceeds over the reference level.

Also, according to the present invention, an in-gear vibration detector incorporated in a wheel speed control system comprises means for detecting a speed of a drive wheel, means for taking a differential of the drive wheel speed, means for producing a reference level, and means for comparing the differential with the reference level and for producing an in-gear signal indicative of the in-gear vibration when the differential exceeds over the reference level.

Furthermore, according to the present invention, an in-gear vibration elimination system incorporated in a wheel speed control system comprises means for detecting a speed of a drive wheel, means for detecting a speed of a non-drive wheel, means for detecting a speed of a vehicle, means for detecting a deviation of the wheel speed from the vehicle speed, wheel speed control means for controlling the speed of the wheel to become nearly equal to the vehicle speed when the deviation detecting means detects that the speed of the wheel deviates from with the speed of the vehicle, means for taking a differential of the drive whel speed, means for producing a reference level, means for comparing the differential with the reference level and for producing an in-gear signal indicative of the in-gear vibration when the differential exceeds over the reference level, and interrupting means for interrupting the operation of the wheel speed control means in response to the in-gear signal and substituting a predetermined in-gear wheel speed control means for said wheel speed control means, thereby eliminating the in-gear vibration caused by the wheel speed control means.

BRIEF DESCRIPTION OF THE DRAWINGS

These and other objects and features of the present invention will become apparent from the following description taken in conjunction with preferred embodiment thereof with reference to the accompanying drawings, throughout which like parts are designated by like reference numerals, and in which.

DESCRIPTION OF THE PREFERRED EMBODIMENT

Figure 1:
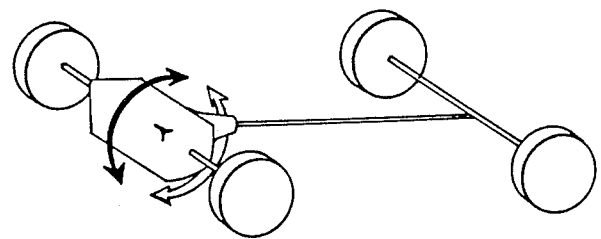
FIG. 1 is a diagrammatic view of a front-drive vehicle mounted with an engine.
Figure 2:
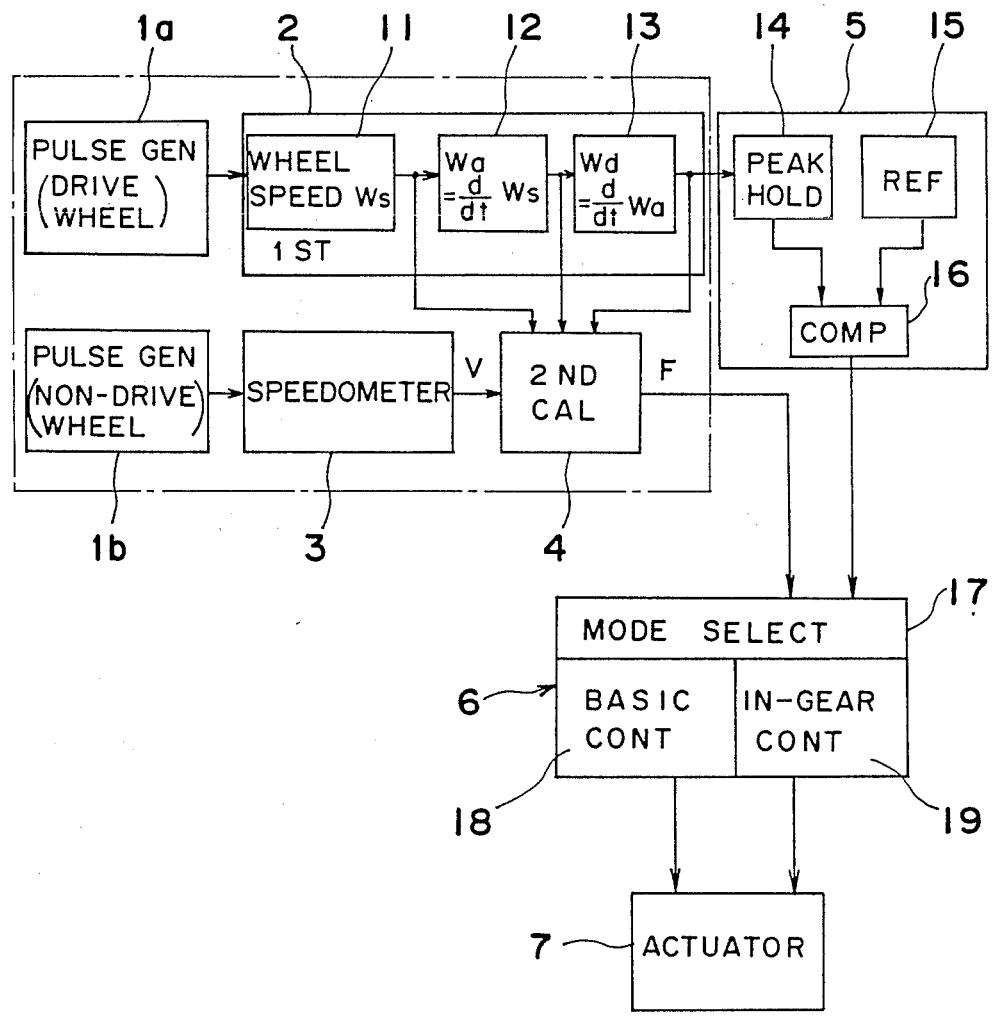
FIG. 2 is a block diagram of an in-gear vibration elimination system according a preferred embodiment of the present invention.

Referring to FIG. 2, a block diagram of an in-gear vibration elimination system according to a preferred embodiment of the present invention is shown. The wheel speed control system incorporating the in-gear vibration elimination means is installed in a vehicle and which comprises pulse generators 1a and 1b in which pulse generator 1a produces pulses having a frequency relative to the speed of the rotation of a drive wheel, i.e., the wheel connected to the engine, and pulse generator 1b produces pulses having a frequency relative to the speed of the rotation of a non-drive wheel, i.e., the wheel not connected to the engine. According to one preferred embodiment, pulse generators 1a and 1b are each formed by an electromagnetic device of a known type.

The pulses from pulse generator 1a are applied to a first calculator 2 which calculates a rotating speed Ws of the drive wheel at block 11, an acceleration Wa of the drive wheel at block 12, and a differential amount Wd of the acceleration of the drive wheel, i.e., second order differential of the wheel speed Ws, at block 13. To this end, block 11 may be previously stored with wheel data, such as the diameter of the wheel. The pulses from pulse generator 1b are applied to a speedometer 3 for calculating the speed V of the vehicle.

The calculated results Ws, Wa and Wd from first calculator 2 and the calculated result V from speedometer 3 are applied to a second calculator 4 which calculates a control parameter F, such as given by the following equation:

$$F = Ws - V + \frac{d}{dt}(Ws - V)$$

The calculated result Wd from first calculator 2 is applied to an in-gear vibration detector 5 which detects whether or not the in-gear vibration has occurred. Instead of first calculator 2, the in-gear vibration detector 5 may be so connected to second calculator 4 for receiving necessary data for the in-gear vibration detection.

The in-gear vibration detector 5 compriess a peak holder 14 for holding the peak value of the second order differential Wd of the wheel speed Ws, a reference signal generator 15 for generating a reference signal, and a comparator 16 for comparing the signals from the peak holder and the reference signal generator and producing an in-gear vibration signal when the signal stored in the peak holder exceeds the reference signal.

The signal from the in-gear vibration detector 5 and the signal F from second calculator 4 are applied to a control circuit 6 having a mode selecting section 17, a basic control section 18 and an in-gear control section 19. When the in-gear vibration detector 5 is not producing the in-gear vibration signal, that is when the in-gear vibration is not taking place, the mode selecting section 17 selects a basic control mode so that signal F is sent to the basic control section 18 at which the antiskid control or brake traction control is effected according to the momentary behavior of the wheel speed. Since the antiskid control and the brake traction control detect the deviation of the wheel speed from the vehicle speed, the antiskid control and the brake traction control are herein generally referred to as a wheel speed control for controlling the speed of the wheel to becomes nearly equal to the vehicle speed when the speed of the wheel deviates from the speed of the vehicle.

On the other hand, when the in-gear vibration detector 5 is producing the in-gear vibration signal, the mode selecting section 17 selects an in-gear control mode so that the antiskid control or brake traction control, i.e., the wheel speed control, is interrupted and an in-gear control, which will be described later, takes place.

An actuator 7 is so connected as to receive signal from basic control 18 or in-gear control 19, and is provided in association with a brake arrangement so that the brake pressure is controlled automatically.

According to a preferred embodiment, the most part of the circuit shown in FIG. 2 may be formed by a microcomputer. Also, speedometer 3 may be formed by the use of a laser or sound source and a receiver so that the speed can be detected by the Doppler effect, or instead, the speed can be calculated from the known parameters. For example, in the case of the brake traction control, the speed can be calculated from the speed of the non-drive wheel, and in the case of the antiskid control, the speed can be calculated by obtanining the maximum speed of the four wheels and filtering the obtained maximum speed, or setting the limitation of the deceleration.

Next, the operation of the circuit of FIG. 2 will be described in connection with a flow chart shown in FIG. 3.

At step #1, pulses from pulse generators 1a and 1b are detected. Then, at step #2, the rotating speed Ws of the drive wheel, the acceleration Wa of the drive wheel, and the differential amount Wd of the acceleration of the drive wheel are calculated in block 2 by the following calculations.

$$Wa = \frac{d}{dt} Ws$$

$$Wd = \frac{d}{dt} Wa = \frac{d}{dt}\left(\frac{d}{dt} Ws\right)$$

Figure 4:
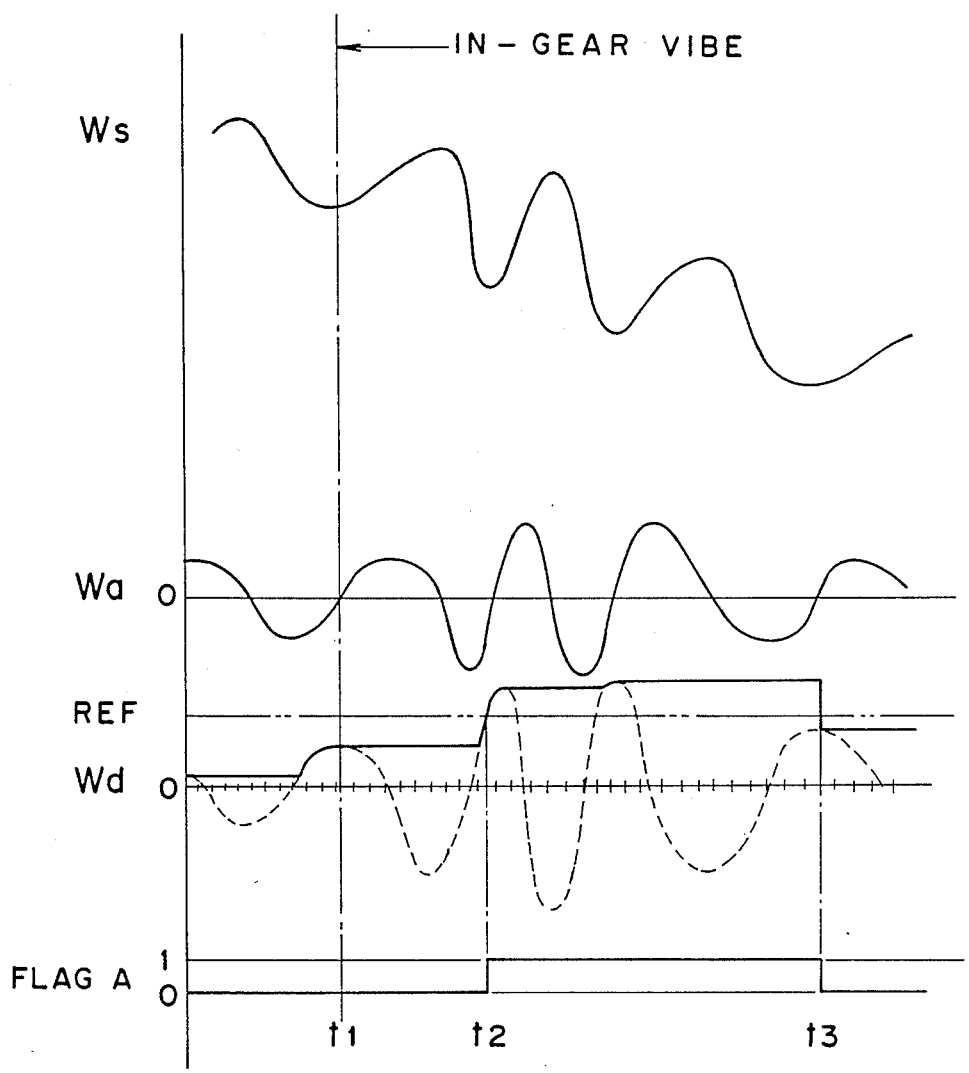
FIG. 4 is a graph showing waveforms observed at various places in the block diagram of FIG. 1.

In FIG. 4, the rotating speed Ws of the drive wheel is shown under such a condition that the brake is effected by accompanying the skid, and thereafter, the in-gear vibration is taking place. In FIG. 4, values Wa and Wd are also shown.

Then, at step #3, the second order differential Wd is obtained and is compared with a predetermined reference REF. The scales shown in FIG. 4 in association with waveform Wd represent the sampling points at which the comparisons are carried out. If Wd is equal to or greater than the reference REF, the program goes to step #5 at which flag A is set representing the in-gear control mode. Step #9 will be carried out, such as at timing t2 shown in FIG. 4. On the contrary, if Wd is less than the reference REF, the program goes to step #6 at which it is detected whether or not Wd now sampled is at the peak point which is located between the reference REF and the zero level. If yes, such as at timing t1 or t3 shown in FIG. 4, the program goes to step #7 at which the flag A is reset representing the basic control mode. If no, the program goes to step #8, which can be also accessed from either #7 or step #5.

Figure 3:
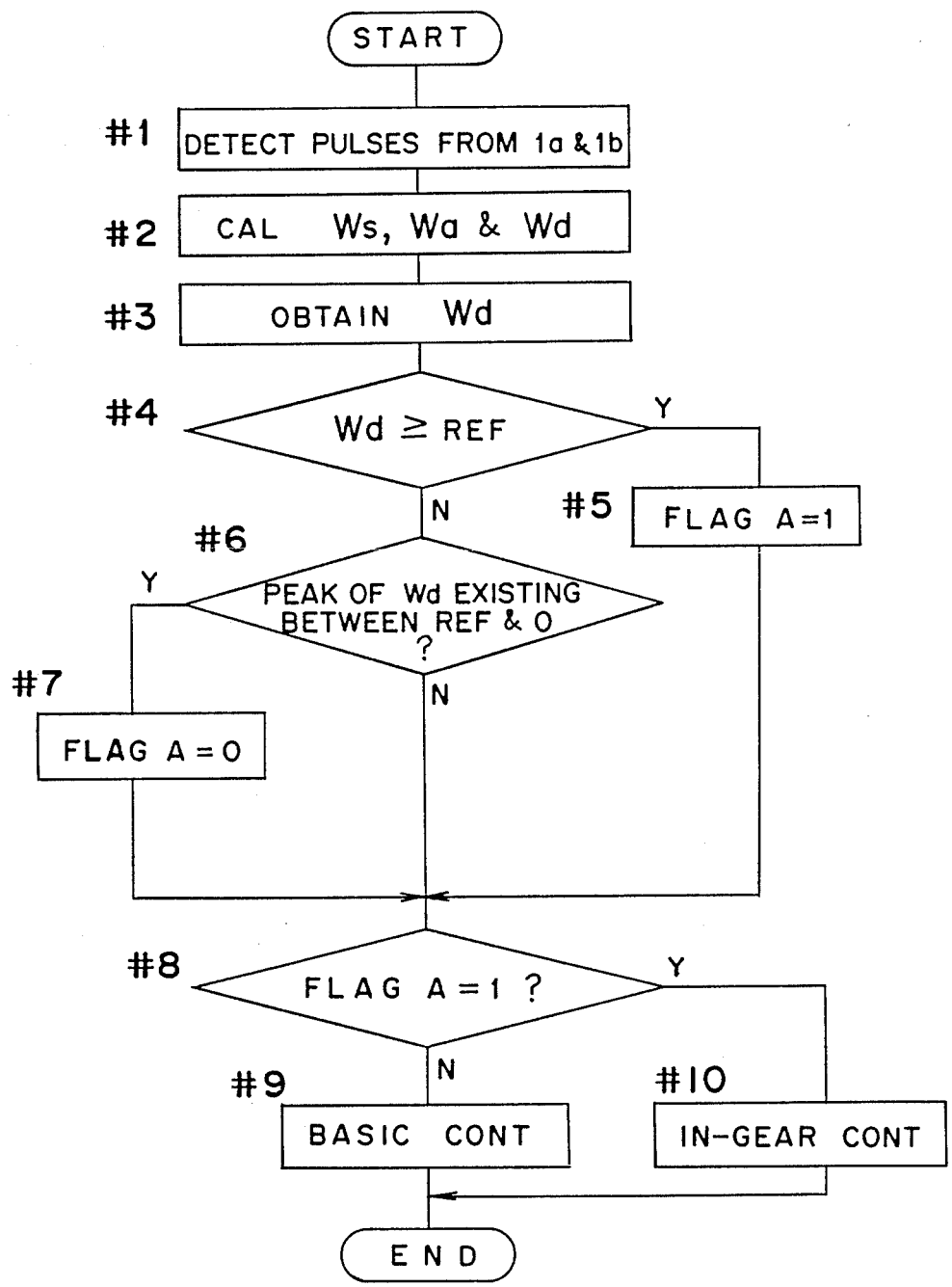
FIG. 3 is a flow chart showing an operation of the in-gear vibration elimination system shown in FIG. 2.

In the flow chart of FIG. 3, the peak of Wd is not held and, therefore, the Wd is compared directly with the reference REF. However, as apparent from the flow chart, the flag A is maintained at the set condition even after Wd falls below the reference REF. Flag A is reset only when the next peak of Wd falls between the reference REF and the zero.

At step #8, it is detected whether or not the flag A is set. If flag A is set, the program goes to step #10 to carry out the in-gear control as effected in block 19, but if not, the program goes to step #9 to carry out the basic control as effected in block 18, both controls will be described in detail below in connection with FIGS. 5a and 5b.

Figures 5A, 5B:
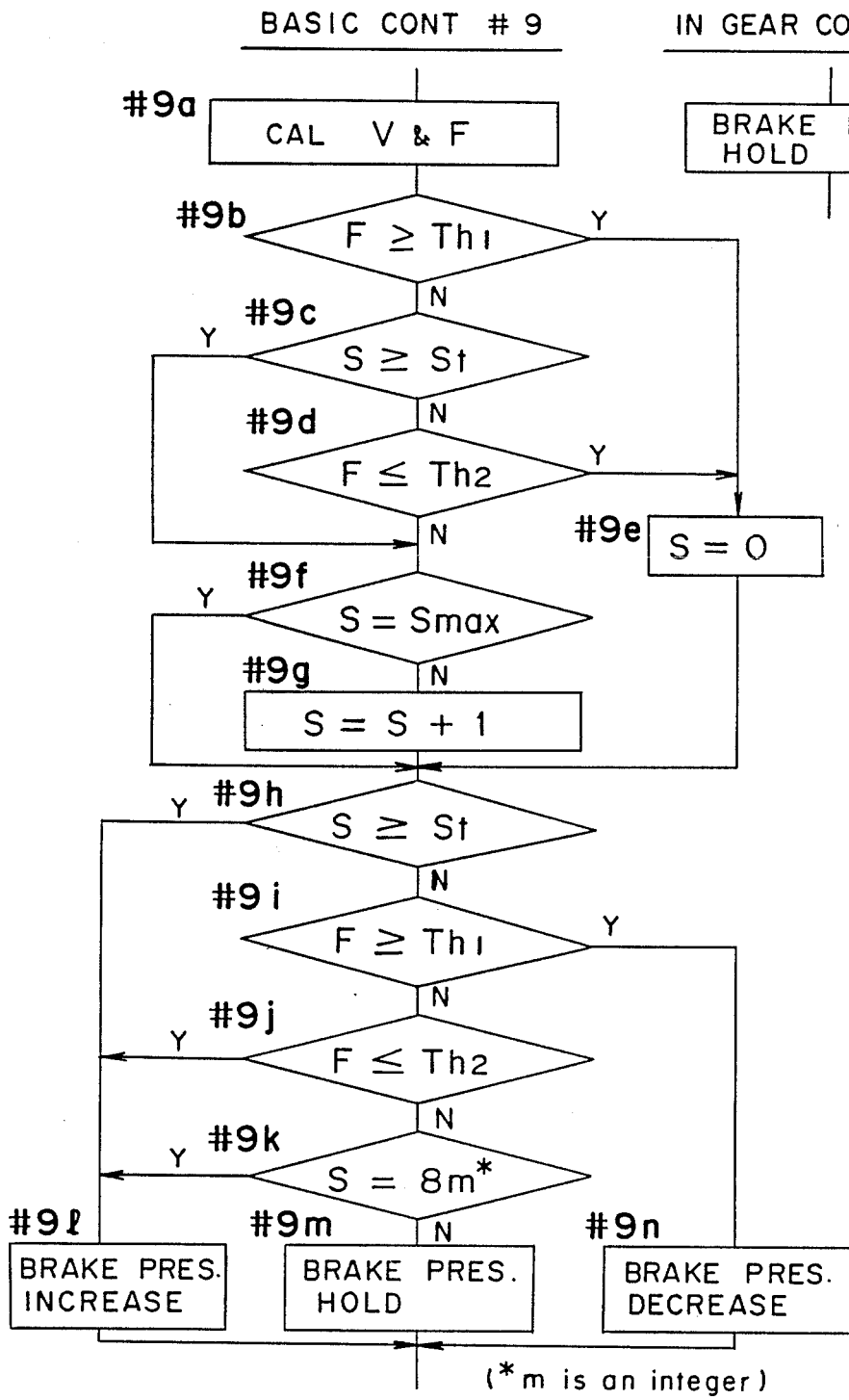
FIG. 5a is a flow chart showing a detail of the basic control operation shown in FIG. 3.
FIG. 5b is a flow chart showing a detail of the in-gear control operation shown in FIG. 3.

The basic control is either the antiskid control or the brake traction control which are already known in the art. The embodiment shown in FIG. 5a is particularly directed to a case when the basic control is the antiskid control. At step #9a, the vehicle speed and the control parameter F are calculated. When the vehicle is braked abruptly, the drive wheel speed Ws, the vehicle speed V and control parameter F change in a manner shown in FIG. 6. Then, at step #9b, the control parameter F is compared with a first threshold Th1 which is in the positive region. If the control parameter F is greater than the first threshold Th1, the program goes to step #9e at which a timer count S is reset, but if not, the program goes to step #9c at which the timer count S is compared with a predetermined time St which is long enough to finish the antiskid control. If the timer count S is greater than the predetermined time St, the program goes to step #9f, but if not, the program goes to step #9d at which the control parameter F is compared with a second hreshold Th2 which is in the negative region. If the control parameter F is less than the second thresold Th2, the program goes to step #9e to reset the timer count S, and if not, the program goes to step #9f. At step #9f, it is detected whether or not the timer count S has reached the maximum Smax. If yes, the program goes to step #9h, and if no, the program goes to step #9g for increasing the timer count S. As apparent from the above, steps #9b–#9g are provided to reset the timer count S when the control parameter F is not located between the thresholds Th1 and Th2 and to count up the timer when the control parameter F is located between the thresholds Th1 and Th2.

At step #9h, it is detected whether or not the timer count S has counted up to the predetermined time St. If the timer has counted up to the predetermined time St from a moment when the control parameter F is located between the thresholds Th1 and Th2, the program goes to step #9l to increase the brake pressure to a level corresponding to the brake pedal stepping pressure. If the timer has not counted up to the predetermined time St, the program goes to step #9i at which it is detected whether or not the control parameter F is greater than the first threshold Th1. If yes, meansing that the wheels are going to fall into a locked condition, the program goes to step #9n to decrease the brake pressure to weaken the braking effect thereby releasing the wheels from being locked. If no, the program goes to step #9j at which it is detected whether or not the control parameter F is less than the second threshold Th2. If yes meaning that the wheels are being released from the locked state, the program goes to step #9l to increase the brake pressure back to the pressure required by the driver. If no, the program goes to step #9k at which it is detected whether or not the timer count S is equal to the multiple of eight. Every eight counts, the program goes to step #9l to temporarily increase the brake pressure, while in other times, the program goes to step #9m to hold the brake pressure.

Referring to FIG. 5b, the in-gear control comprises a step of holding the brake pressure.

Figure 6:
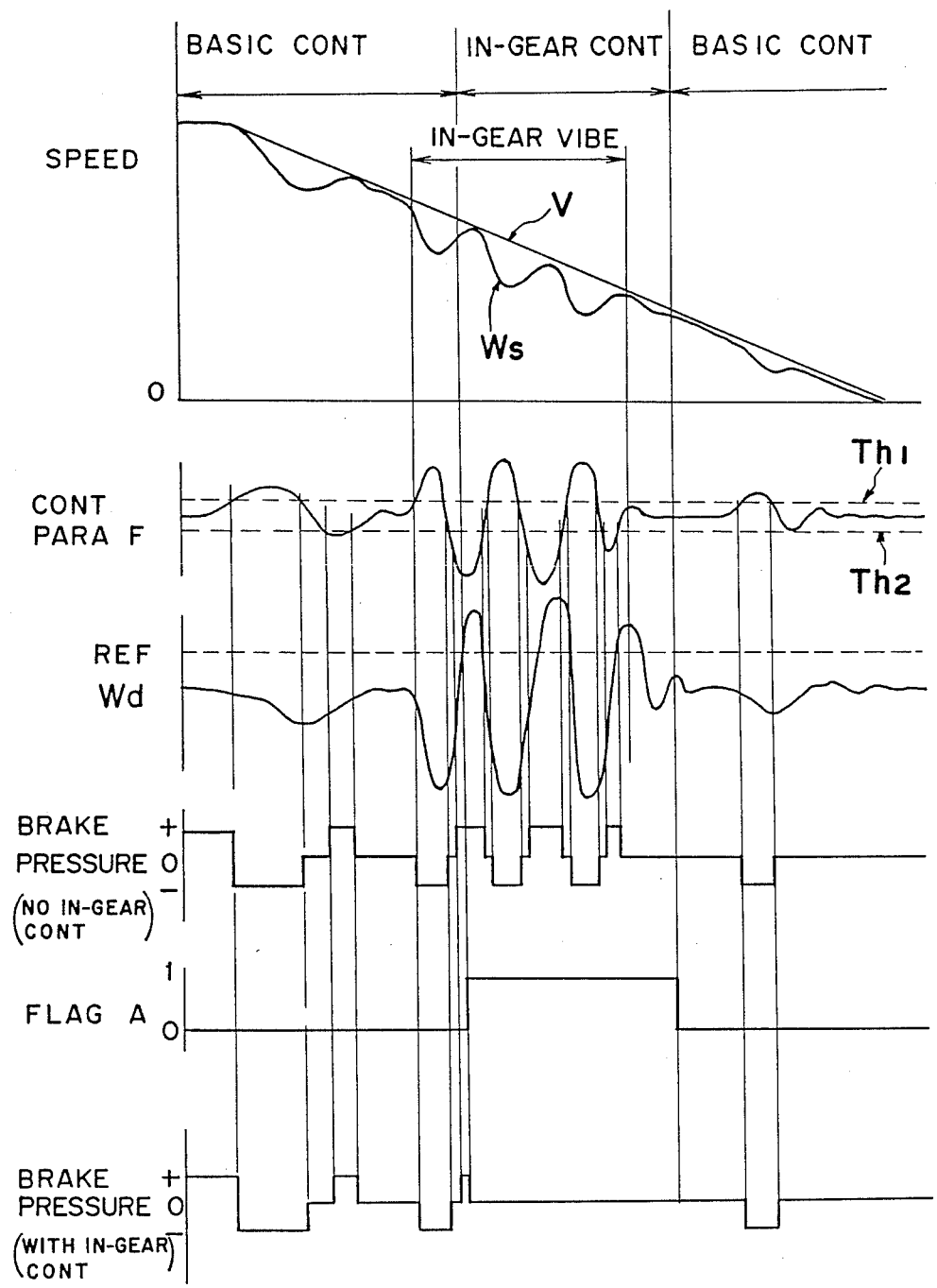
FIG. 6 is a graph showing waveforms observed during the basic control and the in-gear control.

Referring to FIG. 6, a case when the basic control, in-gear control and basic control are carried out sequentially. During the basic control, i.e., antiskid control, the control parameter F is compared with two thresholds Th1 and Th2. When the control parameter F exceeds the threshold Th1, the brake pressure is decreased (steps #9i and #9n), when the control parameter F falls below the threshold Th2 (steps #9j and #9l), the brake pressure is increased, and when F is between Th1 and Th2, the brake pressure is held as it is without any change (steps #9k and #9m). In this manner, the skid is eliminated.

Then, when the differential amount Wd exceeds the reference REF, the program goes to step #10 to start the in-gear control. During the in-gear control, the brake pressure is held as it is without any change (step #10). The in-gear control ends when the positive peak falls below the reference REF. Thereafter, the basic control continues.

As apparent from the above, particularly from FIG. 4, the in-gear vibration is detected by the amplitude of the second order differential Wd. This can be explained as follow.

The wheel speed Ws during the occurrence of the in-gear vibration can be given by the following equation:

$$Ws = \Sigma Vi + Vg \quad (1)$$
$$= \sum_{i=1,2,3,\ldots} (Ai \cdot \cos wi \cdot t) + Ag \cdot \cos wg \cdot t$$

wherein Ai is an amplitude of the wheel speed variation caused by the spin or skid and other factors not related to the rocking motion of the engine; wi is a frequency of the wheel speed vibration caused by the spin or skid and other factors not related to the engine rocking motion; Ag is an amplitude of the rocking motion of the engine; wg is a frequency of the rocking motion of the engine; and t is time. Therefore, in the above equation, the first term ($\Sigma Vi$) represents the wheel speed not related to the engine rocking motion, and the second term (Vg) represents the wheel speed related to the engine rocking motion.

When the above equation (1) is differentiated, the following equation can be given.

$$\frac{d}{dt} Ws = -\sum_{i=1,2,3,\ldots} (Ai \cdot wi \cdot \sin wi \cdot t) - Ag \cdot wg \cdot \sin wg \cdot t \quad (2)$$

Thus, the second order differential of the equation (1) can be given as follows.

$$\frac{d}{dt}\left(\frac{d}{dt} Ws\right) = -\Sigma wi^2 Vi - wg^2 Vg \quad (3)$$

Since it is empirically known that $Ag \geq aI$ and $wg > wi$, in equation (3) the second term ($wg^2 Vg$) representing the in-gear vibration will be much greater than the first term ($-\Sigma wi^2 Vi$). Therefore, when the second order differential d/dt(d/dtWs) becomes greater than a certain level, it is understood that the in-gear vibration has started.

It is to be noted that in order to detect the in-gear vibration, but with less preciseness, the first order differential (d/dt Ws) may be used. Furthermore, other equations including d/dt(d/dt Ws) may be used, such as given below.

$$A \cdot Ws + B \cdot \frac{d}{dt} Ws + C \cdot \frac{d}{dt}\left(\frac{d}{dt} Ws\right)$$

wherein A, B and C are constants determined by vehicle speed, road condition, friction, etc.

According to a preferred embodiment, the reference REF produced from block 15 (FIG. 2) may not be constant, but may be varied with respect to the road surface frictional properties and/or with respect to the roughness of the road.

Figure 7:
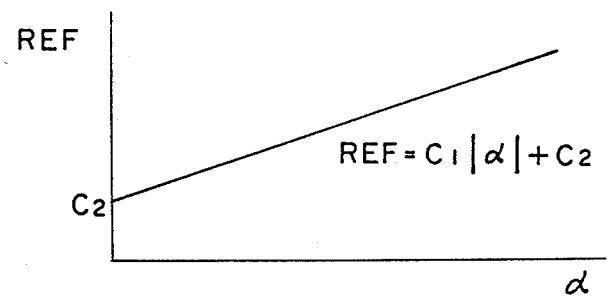
FIG. 7 is a graph showing a change of reference REF relative to the acceleration.

For example, the reference REF may be increased with respect to the increase of the road surface frictional properties, such as shown in FIG. 7 in which the reference REF can be given as follows.

$$REF = C1|\alpha| + C2$$

wherein C1 and C2 are constants and is a deceleration of the vehicle. When the vehicle is stopped at a high deceleration, that means that the road has a high surface frictional properties. In such a case, the in-gear vibration will take place with less possibility. Therefor, the reference REF may be made great to prevent catching false in-gear vibrations.

Figure 8:
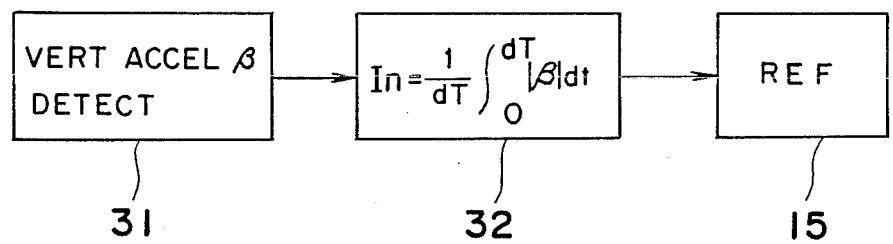
FIG. 8 is a block diagram of a reference control circuit for changing the reference REF relative to the roughness of the road.
Figure 9:
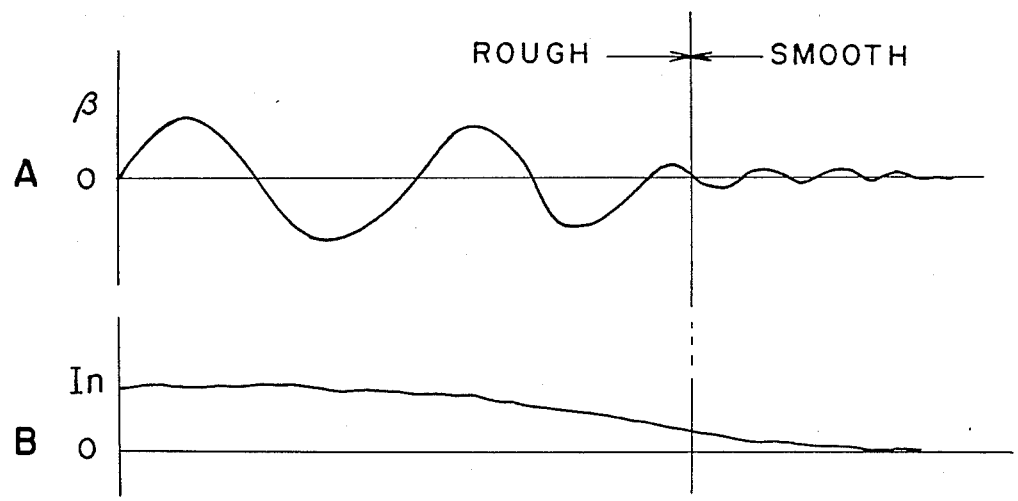
FIG. 9 is a graph showing waveforms obtained from the blocks of FIG. 8.

According to another example, the reference REF may be increased with respect to the increase of the roughness of the road. The roughness of the road can be detected, for example, by using a vertical acceleration detector 31 (FIG. 8) mounted in a vehicle so that the up and down motion of the vehicle caused by bumps in the road can be detected by the vertical acceleration detector 31. The detected vertical acceleration of the vehicle, such as shown in FIG. 9 waveform A, is added to an averaging circuit 32 for taking an average In as shown in block 32. Thus, averaging circuit 32 produces a signal representing the roughness of the road. The signal produced from averaging circuit 32 is added to the reference REF. Thus, the reference REF increases as the road becomes rough. When the road becomes rough, the vibration similar to the in-gear vibration occurs. Thus, by making the reference REF high, such false in-gear vibrations will not be caught.

Instead, the roughness of the road can be detected by taking a differential of the non-drive wheel and then filtering the differential result. The result can be processed in a similar manner described above.

Figure 10:
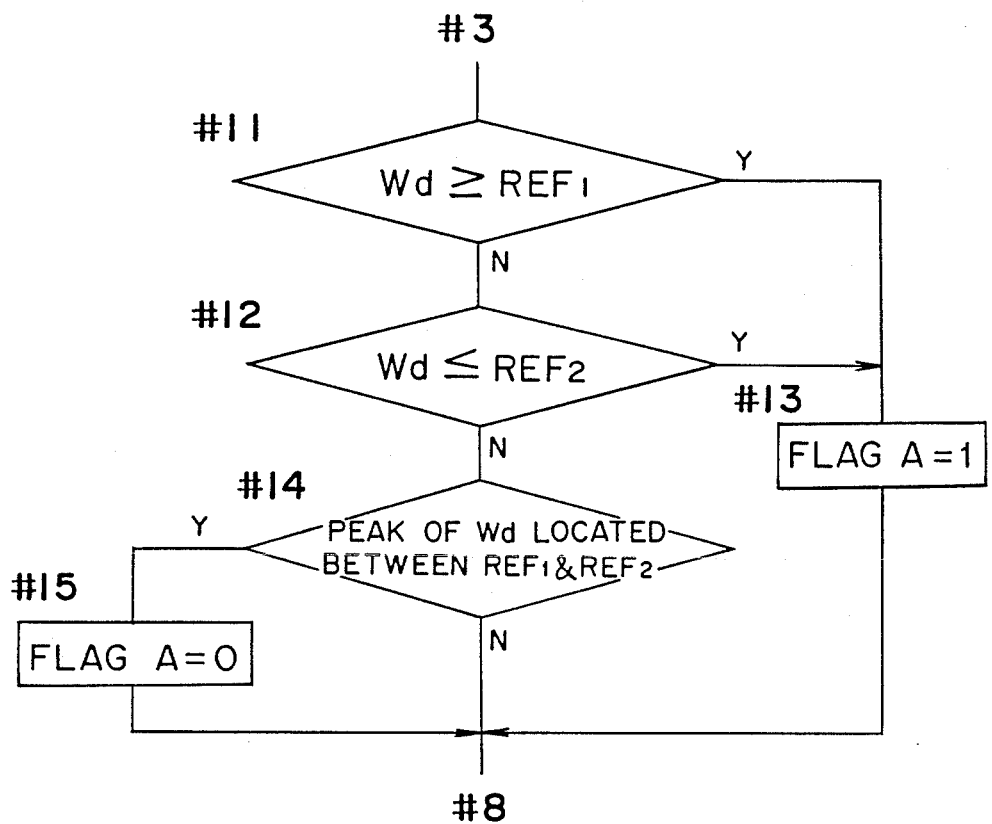
FIG. 10 is a flow chart showing a first modification of the flow chart shown in FIG. 3.
Figure 11:
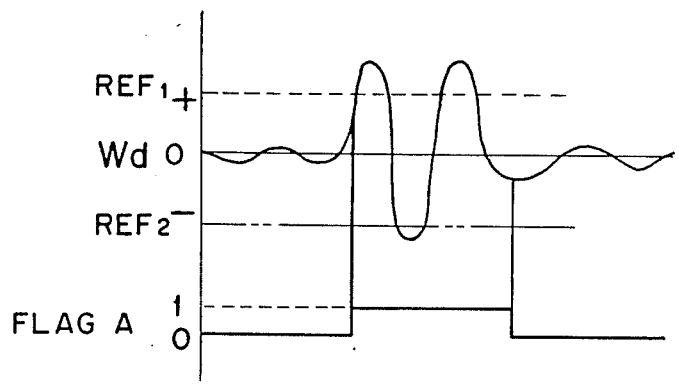
FIG. 11 is a graph showing waveforms for the modification of FIG. 10.

Referring to FIG. 10, a modification of the flow chart is shown wherein steps #11–#15 are illustrated to be replaced with steps #4–#7 illustrated in FIG. 3. In this modification, two references REF1 and REF2 are provided in positive and negative regions, as shown in FIG. 11. When Wd exceeds over reference REF1 (step #11) or when Wd falls below reference REF2 (step #12), flag A is set (step #13). Once flag A is set, it will not be reset peak of Wd is located between references REF 1 and REF2 (Steps#14 and #15). By this modification, the in-gear control can be carried out with more quick response.

Figure 12:
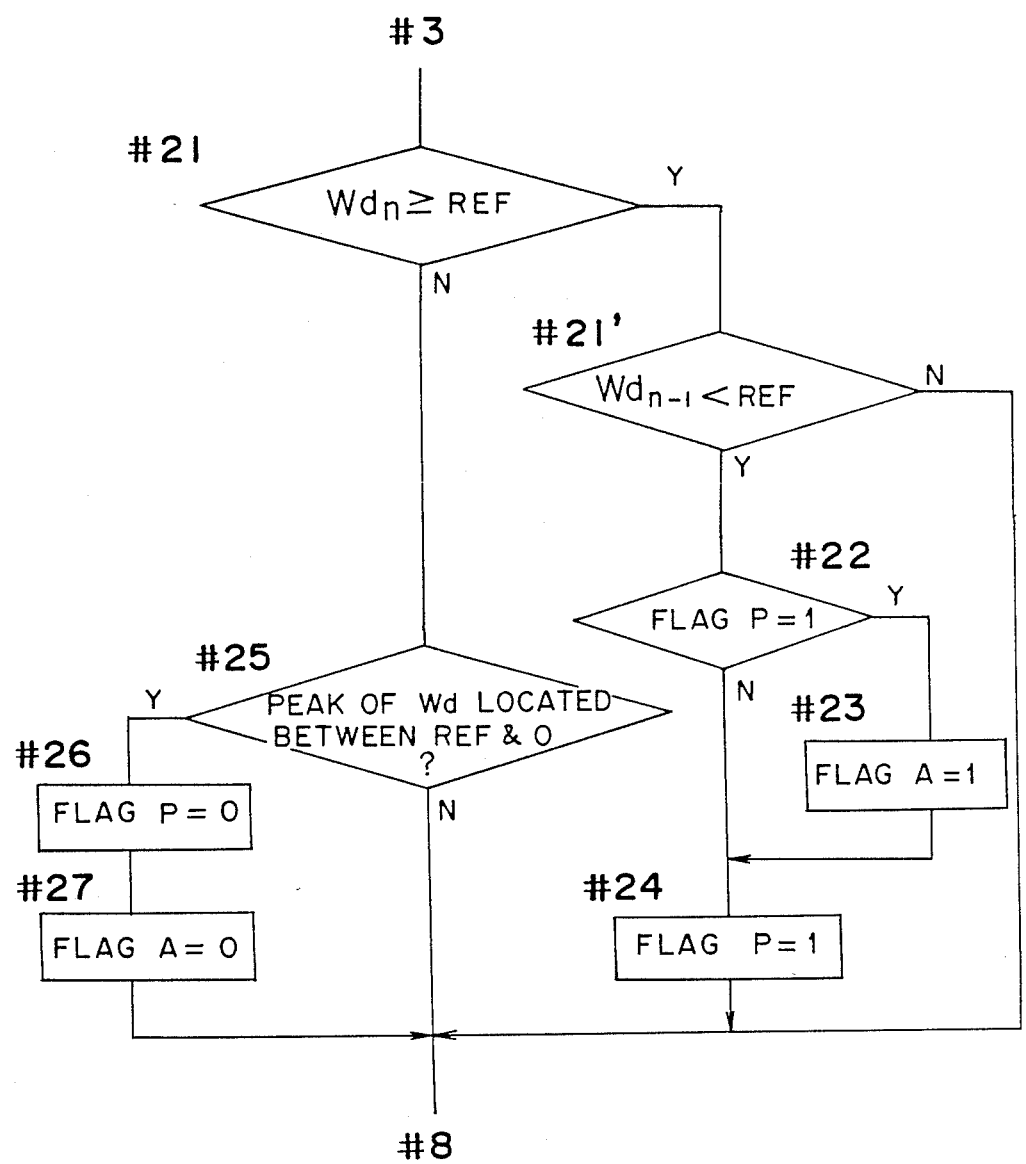
FIG. 12 is a flow chart showing a second modification of the flow chart shown in FIG. 3.

Referring to FIG. 12, another modification of the flow chart is shown wherein steps #21–#27 are illustrated to be replaced with steps #4–#7 illustrated in FIG. 3. In this modification, presumption flag P is used in addition to flag A so that flag A is set only when two subsequent peaks are detected.

At step #21, $Wd_n$ obtained in the present cycle of operation is compared with the reference REF. If $Wd_n$ is greater than the reference REF, the program goes to step #21' at which it is detected whether or not the second order differential $Wd_{n-1}$ obtained was less than the reference REF. at step #21', if the detection result is yes, meaning that the second order differential Wd has crossed the reference REF during a period between the previous cycle and the present cycle, the program goes to step #22. On the contrary, at step #21', if the detection result is no, meaning that the second order differential Wd has crossed the reference REF before more than one cycle and that the second order differential Wd is now in the region above the reference REF, the program jumps to step #8.

At step #22 it is detected whether or not the presumption flap P is set. If the presumption flap P is set, the program goes to step #23 to set flag A and, if not, the program goes to step #24 to set presumption flag P. In this manner, flag A is set only after presumption flag P is set. At step #21, if Wd is not greater than the reference REF, the program goes to step #25 at which it is detected whether or not the peak of Wd is located between the reference REF and zero. If yes, the program goes to steps #26 and #27 to reset flags A and P, and if no, the program goes to step #8.

By this modification, the in-gear vibration can be detected only when the rocking motion takes place for two or more cycles. It is to be noted that the first and second modifications described above in connection with FIGS. 10-12 may be accomplished at the same time so that the in-gear vibration will be detected when Wd becomes greater than reference REF1 and subsequently becomes less than reference REF2, or vice versa.

As has been fully described above, according to the present invention, since the in-gear vibration can be detected with a high preciseness even during the antiskid control or the brake traction control, the in-gear vibration can be eliminated efficiently. Therefore, the antiskid control or the brake traction control can be carried out without more than necessary interruption.

Although the present invention has been fully described with reference to several preferred embodiments, many modifications and variations thereof will now be apparent to those skilled in the art, and the scope of the present invention is therefore to be limited not by the details of the preferred embodiments described above, but only by the terms of the appended claims.

What is claimed is:

1. A method for detecting an in-gear vibration of a vehicle comprising the steps of:
    detecting a speed of a drive wheel;
    taking a second order differential of said drive wheel speed;
    producing a reference level; and
    comparing said second order differential with said reference level and producing a signal indicative of the in-gear vibration when said second order differential exceeds said reference level.

2. An in-gear vibration detector mounted in a vehicle comprising:
    means for detecting a speed of a drive wheel;
    means for taking a second order differential of said drive wheel speed;
    means for producing a reference level; and
    means for comparing said second order differential with said reference level and for producing an in-gear signal indicative of an in-gear vibration when said second order differential exceeds said reference level.

3. An in-gear vibration detector as claimed in claim 2, wherein said producing means produces a constant reference level.

4. An in-gear vibration detector as claimed in claim 2, wherein said producing means produces a reference level which is variable with respect to an acceleration of the vehicle.

5. An in-gear vibration detector as claimed in claim 2, wherein said producing means comprises means for detecting a vertical acceleration of the vehicle, means for taking an average of the vertical acceleration, and means for adding the average to a predetermined reference value.

6. An in-gear vibration detector as claimed in claim 2, wherein said producing means produces a first reference level in a positive region and a second reference level in a negative region.

7. An in-gear vibration detector as claimed in claim 2, wherein said comparing means produces said in-gear signal indicative of the in-gear vibration when said differential exceeds said reference level twice sequentially.

8. An in-gear vibration elimination system provided in a vehicle comprising:
    means for detecting a speed of a drive wheel;
    means for detecting a speed of a non-drive wheel;
    means for obtaining a speed of a vehicle;
    means for detecting a deviation of the drive wheel speed from the vehicle speed;
    wheel speed control means for controlling the speed of the drive wheel to maintain the deviation within a predetermined limit;
    means for taking a differential of said drive wheel speed;
    means for producing a reference level;
    means for comparing said differential with said reference level and for producing an in-gear signal indicative of the in-gear vibration when said differential exceeds said reference level; and
    interrupting means for interrupting the operation of said wheel speed control means in response to said in-gear signal, thereby eliminating the in-gear vibration caused by said wheel speed control means.

9. An in-gear vibration elimination system as claimed in claim 8, wherein said differential taking means takes a second order differential of said drive wheel speed.

10. An in-gear vibration elimination system as claimed in claim 8, wherein said producing means produces a constant reference level.

11. An in-gear vibration elimination system as claimed in claim 8, wherein said producing means produces a reference level which is variable with respect to an acceleration of the vehicle.

12. An in-gear vibration elimination system as claimed in claim 8, wherein said producing means comprises means for detecting a vertical acceleration of the vehicle, means for taking an average of the vertical acceleration, and means for adding the average to a predetermined reference value.

13. An in-gear vibration elimination system as claimed in claim 8, wherein said producing means produces a first reference level in a positive region and a second reference level in a negative region.

14. An in-gear vibration elimination system as claimed in claim 8, wherein said comparing means produces said in-gear signal indicative of the in-gear vibration when said differential exceeds said reference level twice sequentially.

15. An in-gear vibration elimination system as claimed in claim 8, wherein said wheel speed control means is an antiskid control means.

16. An in-gear vibration elimination system as claimed in claim 8, wherein said wheel speed control means is a brake traction control means.

17. An in-gear vibration elimination system as claimed in claim 8, wherein said wheel speed control means controls the wheel speed by a brake pressure change signal.

18. An in-gear vibration elimination system as claimed in claim 17, wherein said interrupting means interrupts said wheel speed control means by maintaining the brake pressure constant regardless of a command by said brake pressure change signal to change a brake pressure on said drive wheel.

19. A wheel speed control sytem provided in a vehicle comprising:
    means for detecting a speed of wheels, at least one of the wheels being a drive wheel;
    means for obtaining a speed of the vehicle;
    wheel speed control means for controlling a drive wheel speed by adjusting a force on the wheels according to a momentary behavior of the wheel speed, thereby maintaining a deviation of the wheel speed from the vehicle speed within a desirable limit;
    interrupting means for controlling the speed of the drive wheel by adjusting the force on the drive wheel according to a predetermined pattern, despite a momentary behavior of the wheel speed, in order to eliminate excessive vibration of the drive wheel; and
    in-gear vibration detecting means for detecting an in-gear vibration of the wheel, producing an in-gear signal when the in-gear vibration is detected, and substituting said interrupting means for said wheel speed control means in response to said in-gear signal.

20. A wheel speed control system as recited in claim 19, wherein said in-gear vibration detecting means comprises:
    means for taking a differential of a drive wheel speed;
    means for producing a reference level; and
    means for comparing said differential with said reference level.

* * * * *